US005939161A

United States Patent [19]
Callahan, Jr. et al.

[11] Patent Number: 5,939,161
[45] Date of Patent: *Aug. 17, 1999

[54] ADHESIVE TAPE STRIP AND TAPE FLAG PADS WITH CENTER TABBED LEADER STRIP

[75] Inventors: Joseph P. Callahan, Jr., St. Paul; Bruce E. Samuelson, Township of West Lakeland, County of Washington, both of Minn.

[73] Assignee: Minnesota Mining and Manufacturing Company, St. Paul, Minn.

[ * ] Notice: This patent is subject to a terminal disclaimer.

[21] Appl. No.: 08/671,016

[22] Filed: Jun. 18, 1996

Related U.S. Application Data

[63] Continuation-in-part of application No. 08/649,310, May 17, 1996, Pat. No. 5,798,159, which is a continuation of application No. 08/263,601, Jun. 21, 1994, Pat. No. 5,518, 144.

[51] Int. Cl.$^{6}$ .......... B32B 7/00

[52] U.S. Cl. .......... 428/40.1; 206/220; 206/449; 206/484; 221/45; 221/61; 221/63; 428/42.1; 428/194; 428/201; 428/212; 428/354

[58] Field of Search .......... 428/40.1, 42.1, 428/194, 201, 212, 354; 206/220, 449, 484; 221/45, 61, 63

[56] References Cited

U.S. PATENT DOCUMENTS

| | | | |
|---|---|---|---|
| 4,416,392 | 11/1983 | Smith | 221/45 |
| 4,586,629 | 5/1986 | Loder | 221/46 |
| 4,586,631 | 5/1986 | Loder | 221/58 |
| 4,653,666 | 3/1987 | Mertens | 221/45 |
| 4,674,634 | 6/1987 | Wilson | 206/554 |
| 4,742,913 | 5/1988 | Emmel et al. | 206/460 |
| 4,768,810 | 9/1988 | Mertens | 282/12 A |
| 4,770,320 | 9/1988 | Miles et al. | 221/33 |
| 4,781,306 | 11/1988 | Smith | 221/33 |
| 4,907,825 | 3/1990 | Miles et al. | 281/51 |
| 4,986,440 | 1/1991 | Windorski | 221/45 |
| 4,993,590 | 2/1991 | Windorski | 221/46 |
| 5,050,909 | 9/1991 | Mertens et al. | 283/81 |
| 5,080,255 | 1/1992 | Windorski | 221/45 |
| 5,086,946 | 2/1992 | Blackwell et al. | 221/45 |
| 5,158,205 | 10/1992 | Bodziak et al. | 221/51 |
| 5,167,346 | 12/1992 | Bodziak | 221/63 |
| 5,401,547 | 3/1995 | Blackwell et al. | 428/40 |
| 5,607,637 | 3/1997 | Blackwell | 428/40.1 |

FOREIGN PATENT DOCUMENTS

WO 95 35215 12/1995 WIPO .

*Primary Examiner*—Nasser Ahmad
*Attorney, Agent, or Firm*—David B. Patchett

[57] ABSTRACT

A centrally tabbed adhesive tape strip pad and centrally tabbed adhesive tape flag pad in which the centrally positioned pull tab portion of the leader strip facilitates initiation of dispensing without the use of prethreaded leader bands and facilitates insertion of a new pad into typical refillable dispensers.

23 Claims, 6 Drawing Sheets

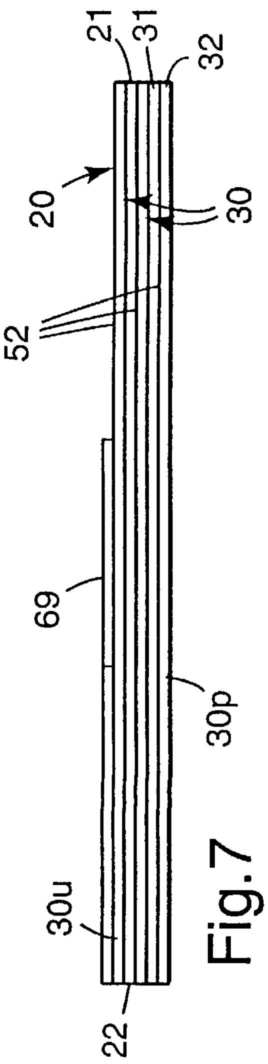
Fig.7
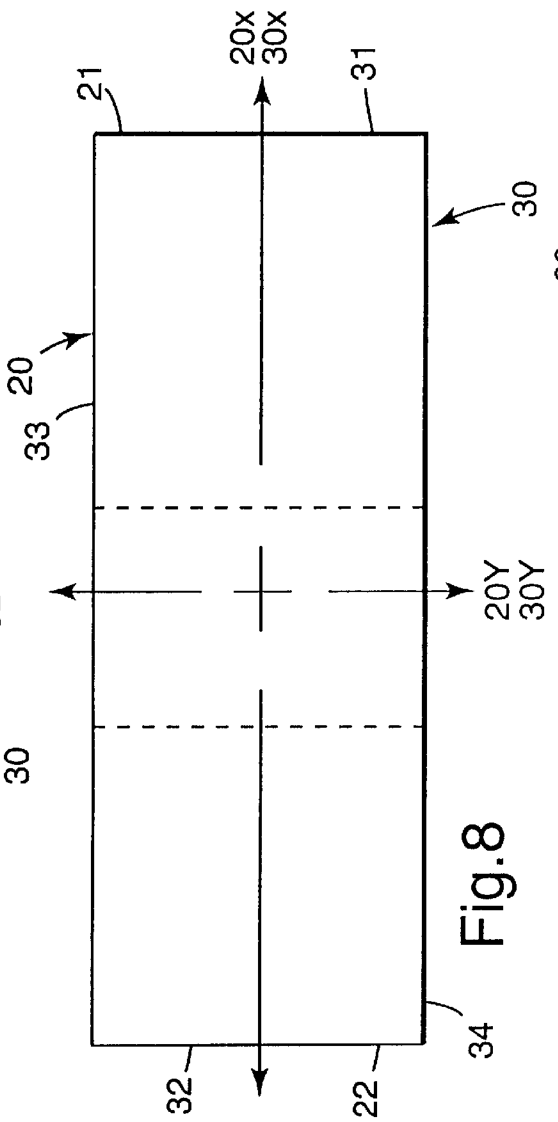
Fig.8
Fig.9
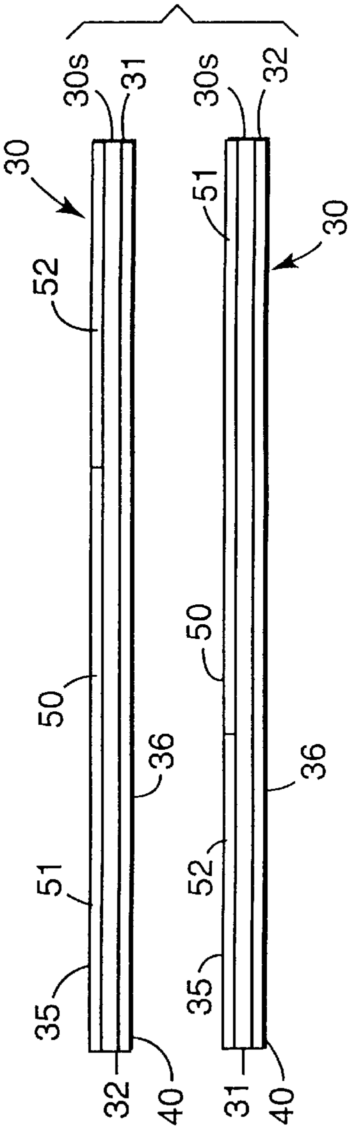

Fig.14
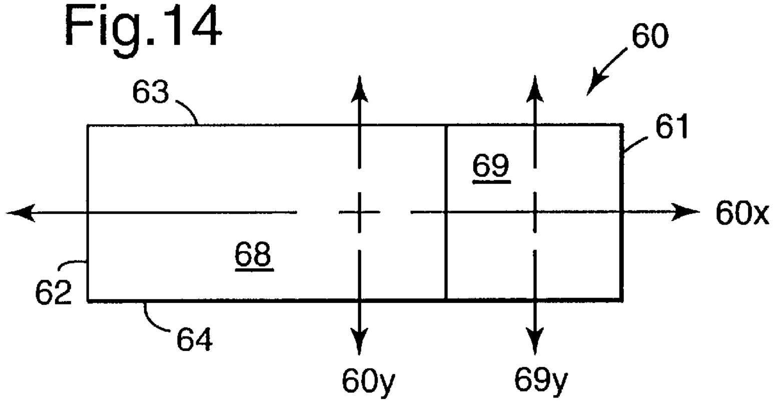
Fig.15
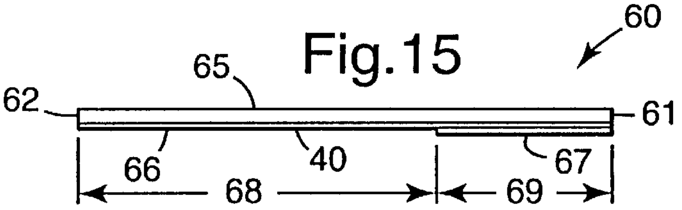
Fig.16
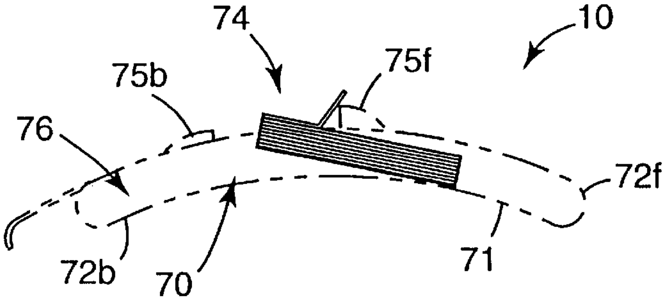
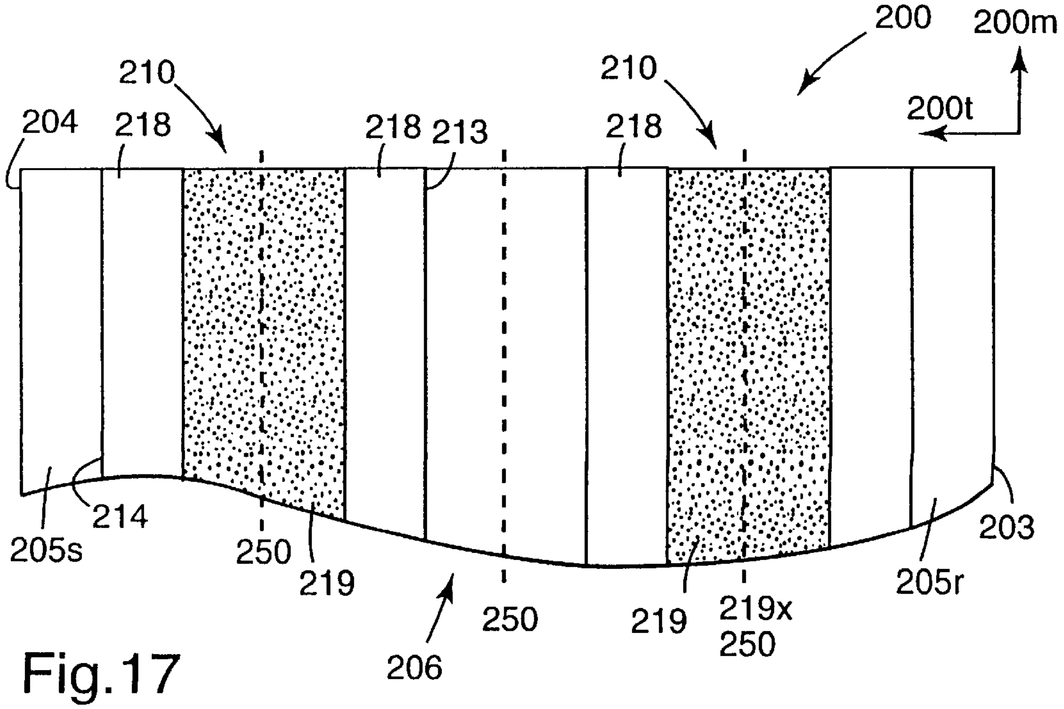
Fig.17

ADHESIVE TAPE STRIP AND TAPE FLAG PADS WITH CENTER TABBED LEADER STRIP

This application is a continuation in part of U.S. patent application Ser. No. 08/649,310 filed May 17, 1996, now U.S. Pat. No. 5,798,159, which is a continuation of U.S. patent application Ser. No. 08/263,601 filed Jun. 21, 1994 and issued as U.S. Pat. No. 5,518,144.

FIELD OF THE INVENTION

The invention broadly relates to pads of adhesive tape strips and adhesive tape flags. More specifically, the invention relates to leader strips used to initiate dispensing of individual adhesive tape strips and adhesive tape flags from such pads.

BACKGROUND

Rolls of adhesive tape and pads of adhesive tape flags are widely used throughout the world. The most widely used variety of adhesive tape flags are those which utilize a repositionable adhesive.

Rolls of repositionable tape, such as the “Post-It®” brand rolls of repositionable tape sold by Minnesota Mining and Manufacturing of Saint Paul, Minn., have a variety of uses, including the mounting of customized signage sheets to a window (e.g. “Dog Lost Poster”) and mounting easel pad pages to a wall after they have been removed from the easel pad.

Pads of repositionable tape flags, such as the widely used “Post-It®” brand tape flags sold by Minnesota Mining and Manufacturing of Saint Paul, Minn. have become a staple office supply product throughout the world.

A variety of dispensers have been developed for the pads of adhesive tape flags. These dispensers include (i) disposable and refillable dispensers, (ii) shuttling and nonshuttling dispensers, (iii) high volume/high profile and low volume/low profile dispensers, (iv) single pad and multiple pad dispensers, (v) hand held and mountable dispensers, etc.

One common feature found on most pads of adhesive tape flags, regardless of the type of dispenser used, is the presence of some type of leader strip used to initiate dispensing of individual flags from the pad. While a variety of useful leader strip configurations have been developed, a continuing need exists for a leader strip configuration which is simple and inexpensive to manufacture and install, useful with a variety of different types of dispensers, reliable, and easy for consumers to use.

SUMMARY OF THE INVENTION

We have discovered a unique leader tape configuration for use in connection with pads of adhesive tape strips and adhesive tape flags.

ADHESIVE TAPE STRIP PAD

The adhesive tape strip embodiment of our invention comprises a leader strip attached to a pad of adhesive tape strips. The pad comprises a plurality of superimposed individual tape strips.

The first major surface of each tape strip is coated with a low adhesion backsize to facilitate separation of the individual strips, while the second major surface of each tape strip is coated with an adhesive. The pad includes an uppermost tape strip with an exposed first major surface of the uppermost tape strip, and a lowermost tape strip with an exposed second major surface of the lowermost tape strip.

The leader strip is aligned with and superimposed over a portion of the exposed first major surface of the uppermost tape strip. A tacky first longitudinal end portion of the leader strip is positioned proximate the first longitudinal edge of the pad and adhesively bonded to the exposed first major surface of the uppermost tape strip, while a nontacky second longitudinal end portion of the leader strip is positioned intermediate the first and second longitudinal edges of the pad so as to form a nontacky centrally positioned pull tab portion.

The pull tab portion does not bond to the pad and can be readily grasped for initiating dispensing of individual tape strips from the pad. The pull tab portion is preferably positioned so that the free longitudinal end of the pull tab portion is longitudinally spaced less than about one fifth the complete longitudinal length of the pad away from the lateral axis of the pad.

Continued dispensing of the individual tape strips is achieved by (i) adhering the second major surface of each individual tape strip in the pad to the first major surface of an immediately underlying tape strip at a first adhesive strength, except for a selected area proximate one of the longitudinal edges of the strip where the tape strip is adhered to the first major surface of the immediately underlying strip at a lower adhesive strength, and (ii) configuring the individual tape strips in the pad so that successive strips in the pad are positioned with the lower adhesive strength area of each strip alternating between the first and second longitudinal edges of the pad. The difference in adhesive strengths is selected so that the lower adhesive strength portion of each strip will delaminate from the immediately underlying strip when an immediately overlying strip is peeled from the pad.

The change in adhesive strength can be achieved by several mechanisms including (i) coating only a portion of the second surface of each tape strip with adhesive, (ii) pattern coating the adhesive onto the second surface of each tape strip so as to coat less adhesive onto a portion of the second surface of each tape strip, (iii) pattern coating a low adhesion backsize onto the first surface of each tape strip so as to coat less backsize onto a portion of the first surface of each tape strip, etc.

ADHESIVE TAPE FLAG PAD

The adhesive tape flag embodiment of our invention is substantially similar to the adhesive tape strip embodiment, and comprises a leader strip attached to a pad of adhesive tape flags. The pad of flexible adhesive tape flags comprises a plurality of superimposed individual tape flags which form a unitary pad having an uppermost tape flag with an exposed first major surface, and a lowermost tape flag with an exposed second major surface. The first major surface of each tape flag has (i) a first tacky area proximate a first longitudinal end of the flag which is coated with a repositionable adhesive, and (ii) a second nontacky area proximate a second longitudinal end of the sheet.

The leader strip is aligned with and superimposed over a portion of the exposed first major surface of the uppermost tape strip. A tacky first longitudinal end portion of the leader strip is positioned proximate the first longitudinal edge of the pad and adhesively bonded to the exposed first major surface of the uppermost tape flag proximate the nontacky second longitudinal end of the uppermost tape flag. A nontacky second longitudinal end portion of the leader strip is positioned intermediate the first and second longitudinal edges of the pad so as to form a nontacky centrally positioned pull tab portion.

The pull tab portion does not bond to the pad and can be readily grasped for initiating dispensing of individual tape flags from the pad. The pull tab portion is preferably positioned so that the free longitudinal end of the pull tab portion is longitudinally spaced less than about one fifth the complete longitudinal length of the pad away from the lateral axis of the pad.

Continued dispensing of the individual tape flags is achieved by (i) adhering the tacky first longitudinal end of the second major surface of each individual tape flag in the pad to the first major surface of an immediately underlying tape flag, and (ii) configuring the individual tape flags in the pad so that successive flags in the pad are positioned with the first longitudinal end of each flag alternating between the first and second longitudinal edges of the pad.

DISPENSER

The adhesive tape strip pads and adhesive tape flag pads can be conveniently dispensed from a dispenser comprising an enclosure defining a retention chamber into which the pad is inserted. The enclosure has a base, side walls, and a top with a centrally positioned opening having a width which typically extends substantially the entire width of the retention chamber and a length which is large enough to permit the passage of a tape strip or flag through the opening yet small enough to prevent the full length of a tape strip or flag from falling back into the retention chamber once a portion of the tape strip has been pulled through the opening.

A cover may optionally be provided for purposes of sealing the opening through the top of the enclosure and exposing the leader strip when the cover is removed.

The dispenser may be constructed as a single use dispenser to be discarded when the pad of tape strips or tape flags within the retention chamber are exhausted, or a refillable dispenser equipped with a mechanism operable for allowing accesses to the retention chamber for purposes of inserting a new pad into the chamber.

The dispenser may also be constructed as a shuttling or nonshuttling dispenser, with the length of the retention chamber either oversized to permit back and forth shuttling of the pad within the chamber as individual tape strips or tape flags are pulled from the pad, or sized to accommodate the pad with substantially no space for back and forth shuttling of the pad within the chamber as individual tape strips or tape flags are pulled from the pad.

METHOD OF MAKING ADHESIVE TAPE STRIPS AND FLAGS

The invention includes a method of making the centrally tabbed adhesive tape strips and adhesive tape flags (hereinafter referenced collectively as "adhesive tape") comprising the steps of:

(1) conveying a master pad containing a plurality of superimposed adhesively coated sheets in a machine direction, with each sheet having (i) a tacky first major surface, (ii) a nontacky second major surface, and (iii) first and second sides;

(2) conveying a continuous length of tabbing material in the machine direction, with the tabbing material having (i) first and second sides; (ii) a first major surface having nontacky side margins and a tacky central area between the side margins coated with an adhesive, and (iii) a nontacky second major surface;

(3) laminating the first major surface of a length of the tabbing material to the second major surface of the uppermost sheet on the master pad, with the tabbing material offset from both sides of the master pad so as to define uncovered side margins on the master pad;

(4) cutting the tabbed master pad in the machine direction within the tacky portion of the tabbing material so as to produce continuous machine direction lengths of tape having (i) a first side portion covered with the adhesive portion of the tabbing material, (ii) a second side portion free from tabbing material, and (iii) a nontacky tab intermediate the first and second sides of the tape formed from one of the nontacky side margins on the tabbing material; and (5) cutting the tabbed master pad in the transverse direction so as to produce tape of a desired width.

When two or more lengths of tabbing material are laminated to the master pad of adhesive sheets, the manufacturing process must comply with two additional requirements. First, the lengths of tabbing material must be offset from each other so as to define intermediate gaps between the lengths of tabbing material on the master pad which are not covered with tabbing material. Second, the tabbed master pad must be cut in the machine direction between adjacent pairs of nontacky side margins from different lengths of tabbing material.

BRIEF DESCRIPTION OF THE DRAWINGS

FIG. 7 is a side view of the adhesive tape strip pad shown in FIG. 1.

FIG. 8 is a top view of the adhesive tape strip pad shown in FIG. 7.

FIG. 9 is an enlarged and exploded side view of two of the adhesive tape strips shown in FIG. 7.

FIG. 14 is a top view of the leader strip shown in FIG. 2.

FIG. 15 is an enlarged side view of the leader strip shown in FIG. 14.

FIG. 16 is a side view of an adhesive tape strip pad of this invention being inserted into the retention chamber of a refillable dispenser shown in phantom.

FIG. 17 is a top view of a first embodiment of a master pad of adhesive sheets to which two lengths of tabbing material have been laminated.

DETAILED DESCRIPTION OF THE INVENTION INCLUDING A BEST MODE

NOMENCLATURE

Figure 1:
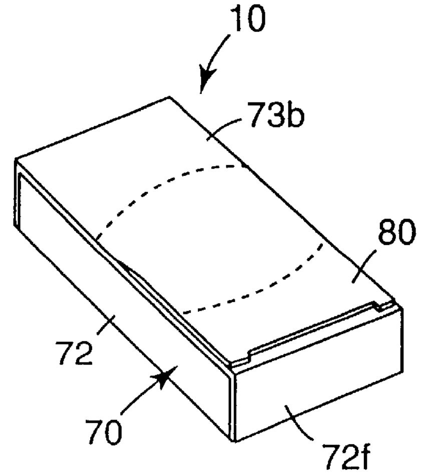
FIG. 1 is a perspective view of a first embodiment of the invention depicting an adhesive tape strip pad within a closed dispenser.
Figure 2:
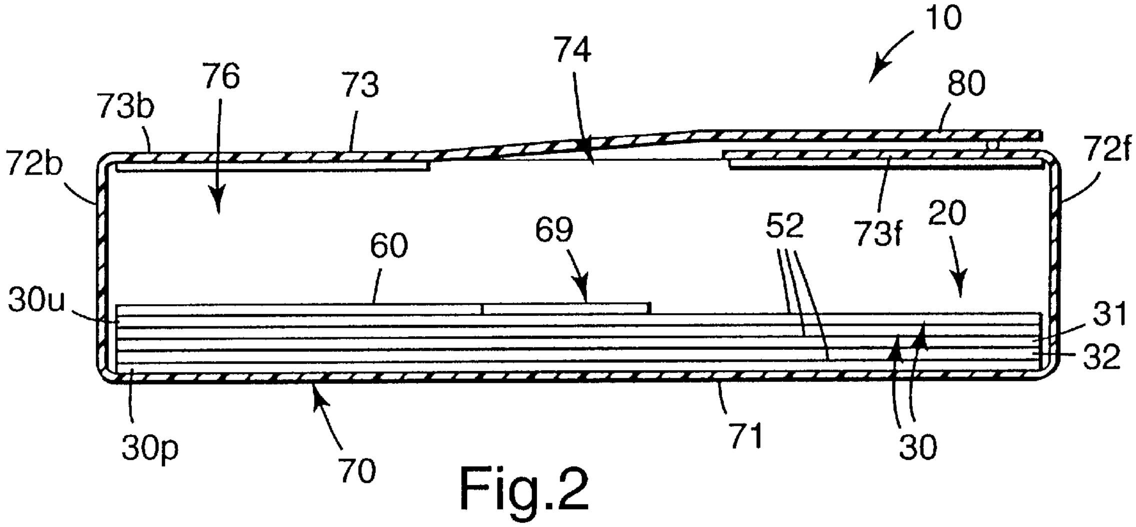
FIGS. 2 through 6 are enlarged sectional side views of the invention shown in FIG. 1 illustrating sequential dispensing of adhesive tape strips from the adhesive tape strip pad within the dispenser.

10 Dispenser Package
20 Adhesive Tape Strip Pad
20*x* Longitudinal Axis of Adhesive Tape Strip Pad
20*y* Lateral Axis of Adhesive Tape Strip Pad
21 First Longitudinal Edge of Adhesive Tape Strip Pad
22 Second Longitudinal Edge of Adhesive Tape Strip Pad

30 Individual Adhesive Tape Strips
30*s* Substrate
30*u* Uppermost Adhesive Tape Strip
30*p* Lowermost Adhesive Tape Strip
30*x* Longitudinal Axis of Adhesive Tape Strips
30*y* Lateral Axis of Adhesive Tape Strips
31 First Longitudinal End of Adhesive Tape Strip
32 Second Longitudinal End of Adhesive Tape Strip
33 First Lateral Side of Adhesive Tape Strip
34 Second Lateral Side of Adhesive Tape Strip
35 First Major Surface of Adhesive Tape Strip
36 Second Major Surface of Adhesive Tape Strip
40 Adhesive Coating
50 Low Adhesion Backsize Coating
51 Area of Low Adhesion Backsize Pattern Coated for Higher Adhesion
52 Area of Low Adhesion Backsize Pattern Coated for Lower Adhesion
60 Leader Strip
60*x* Longitudinal Axis of Leader Strip
60*y* Lateral Axis of Leader Strip
61 First Longitudinal End of Leader Strip
62 Second Longitudinal End of Leader Strip
63 First Lateral Side of Leader Strip
64 Second Lateral Side of Leader Strip
65 First Major Surface of Leader Strip
66 Second Major Surface of Leader Strip
67 Detackifying Coating
68 Tacky Area of First Major Surface of Leader Strip
69 Nontacky Area of First Major Surface of Leader Strip (Pull tab portion)
69*y* Lateral Axis of Pull tab portion
70 Dispenser
71 Base
72*f* Front Wall of Dispenser
72*b* Back Wall of Dispenser
72 Side Walls of Dispenser
73 Top of Dispenser
73*f* First Side of Dispenser Top
73*b* Second Side of Dispenser Top
74 Opening in Top of Dispenser
75*f* First Abutment Surface
75*b* Second Abutment Surface
76 Retention Chamber
80 Cover
120 Adhesive Tape Flag Pad
120*x* Longitudinal Axis of Adhesive Tape Flag Pad
120*y* Lateral Axis of Adhesive Tape Flag Pad
121 First Longitudinal Edge of Adhesive Tape Flag Pad
122 Second Longitudinal Edge of Adhesive Tape Flag Pad
130 Individual Adhesive Tape Flags
130*u* Uppermost Adhesive Tape Flag
130*p* Lowermost Adhesive Tape Flag
130*x* Longitudinal Axis of Adhesive Tape Flags
130*y* Lateral Axis of Adhesive Tape Flags
131 First Longitudinal End of Adhesive Tape Flags
132 Second Longitudinal End of Adhesive Tape Flags
133 First Lateral Side of Adhesive Tape Flags
134 Second Lateral Side of Adhesive Tape Flags
135 First Major Surface of Adhesive Tape Flags
136 Second Major Surface of Adhesive Tape Flags
138 Tacky Area of First Major Surface of Adhesive Tape Flags
139 Nontacky Area of First Major Surface of Adhesive Tape Flags
140 Adhesive Coating
200 Master Pad
200*m* Machine Direction
200*t* Transverse Direction
203 First Side of Master Pad
204 Second Side of Master Pad
205*r* First Uncovered Side Margin
205*s* Second Uncovered Side Margin
206 Uncovered Intermediate Gaps Between Lengths of Tabbing Material
210 Length of Tabbing Material
213 First Side of Tabbing Material
214 Second Side of Tabbing Material
218 Nontacky Side Margins on Tabbing Material
219 Tacky Central Area on Tabbing Material
219*x* Longitudinal Axis of Tacky Central Area on Tabbing Material
250 Machine Direction Cut Line

DEFINITIONS

The term "major surface" refers the top and bottom surfaces of a sheet, such as the surface of the paper sheet upon which these words are printed.

As utilized herein, including the claims, the term "nontacky" means lack of adhesive tack at room temperate and pressure.

The term "repositionable adhesive" is a term of art which is utilized herein in accordance with its standard industry meaning. Broadly, a repositionable adhesive is an adhesive which permits typical tape strip and tape flag substrates, such as paper and polymeric films, to be repeatedly attached to and removed from various surfaces, such as paper, without significant loss in adhesive strength, without leaving adhesive residue upon the surface, and without destruction of the substrate.

The term "tape flag" is a widely used term of art which is utilized herein in accordance with its standard industry meaning. Broadly, a tape flag is a flexible substrate with a first end of a first major surface coated with an adhesive, usually a repositionable adhesive, and a nontacky second end of the first major surface. Tape flags are usually rectangular in shape and about 1 to 6 cm wide and about 3 to 10 cm long although other sizes and shapes are certainly possible. The nontacky end of the substrate is typically color coded or printed with indicia. A variety of means can be employed to render the second end of the first major surface nontacky including (i) limiting application of the adhesive coating to only the first end of the first major surface, or (ii) allowing the adhesive coating to be applied to the entire surface area of the first major surface and then applying a nontacky material, coating or liner over the adhesive at the second end.

The term "tape strip" is a widely used term of art which is utilized herein in accordance with its standard industry meaning. Broadly, a tape strip is a flexible substrate with a first major surface coated with an adhesive. Tape strips are usually rectangular in shape and about 1 to 10 cm wide and about 3 to 20 cm long, most frequently about 1 to 5 cm wide and about 3 to 10 cm long, although other sizes and shapes are certainly possible.

CONSTRUCTION

A unique leader strip 60 is provided for use on adhesive tape strip pads 20 and adhesive tape flag pads 120. The leader strip 60 is simple and inexpensive to manufacture and install on the pads, useful with a variety of different types of dispensers, reliable, and easy for consumers to use.

ADHESIVE TAPE STRIP PAD

INDIVIDUAL TAPE STRIPS

As shown in FIGS. 1 through 9, the adhesive tape strip embodiment of the invention comprise a leader strip 60 attached to a pad 20 of adhesive tape strips 30.

The adhesive tape strip pad 20 is comprised of a plurality of superimposed individual tape strips 30. The tape strips 30 are constructed from a flexible substrate 30*s*, such as paper, polyethylene, polypropylene, polyethylene terephthalate, etc. The individual tape strips 30 define a longitudinal axis 30*x* and a lateral axis 30*y* and have a first longitudinal end 31, a second longitudinal end 32, a first lateral side 33, a second lateral side 34, a first major surface 35, and a second major surface 36. The first major surface 35 of each tape strip 30 is coated with a low adhesion backsize 50 to facilitate separation of the superimposed individual strips 30. The second major surface 36 of each tape strip 30 is coated with an adhesive 40, such as a repositionable adhesive or a permanent pressure sensitive adhesive.

TAPE STRIP PAD

The pad 20 of adhesive tape strips 30 defines a longitudinal axis 20*x* and a lateral axis 20*y*, and has a first longitudinal edge 21 and a second longitudinal edge 22. The pad 20 has an uppermost tape strip 30*u* and a lowermost tape strip 30*p*.

The pad 20 is formed from any desired number of individual adhesive tape strips 30, preferably between about 10 and 120 tape strips 30, by adhering the second major surface 36 of each individual tape strip 30 to the first major surface 35 of an immediately underlying tape strip 30. The first major surface 35 of the tape strips 30 are pattern coated with a low adhesion backsize 50 with a first pattern coating provided over a first area 51 and a second pattern coating provided over a second area 52 of the adhesive tape strips 30. The first pattern coating permits a higher adhesion strength than the second pattern coating (i.e., the pattern of the first pattern coating covers less surface area than the pattern of the second pattern coating). The individual adhesive tape strips 30 are then stacked in a Z pattern with successive strips 30 in the pad 20 positioned with the high adhesion pattern coated area 51 of each strip 30 alternating between the first 21 and second 22 longitudinal edges of the pad 20. The difference in adhesive strength between the high adhesion pattern coated area 51 and the low adhesion pattern coated area 52 is selected so that the lower adhesive strength portion 52 of each strip 30 will delaminate from the immediately underlying strip 30 when an immediately overlying strip 30 is peeled from the pad 20.

The change in adhesive strength can also be achieved by several other mechanisms, including specifically, but not exclusively, (i) coating only a portion of the first major surface 35 of each tape strip 30 with low adhesion backsize 50, (ii) coating only a portion of the second major surface 36 of each tape strip 30 with adhesive 40, and (ii) pattern coating the adhesive 40 onto the second major surface 36 of each tape strip 30 in a fashion similar to the pattern coating of the low adhesion backsize 50 described above.

ADHESIVE TAPE FLAG PAD

INDIVIDUAL TAPE FLAGS

As shown in FIGS. 10 through 13, the adhesive tape flag embodiment of the invention comprises a leader strip 60 attached to a pad 120 of adhesive tape flags 130.

The adhesive tape flag pad 120 is comprised of a plurality of superimposed individual tape flags 130. The tape flags 130 are constructed from a flexible substrate 130*s*, such as paper, polyethylene, polypropylene, polyethylene terephthalate, etc. The individual tape flags 130 define a longitudinal axis 130*x* and a lateral axis 130*y* and have a first longitudinal end 131, a second longitudinal end 132, a first lateral side 133, a second lateral side 134, a first major surface 135, and a second major surface 136.

The second major surface 136 of each tape flag 130 is coated with an adhesive 140, usually a repositionable adhesive. A first longitudinal end portion 138 of the second major surface 136 of each tape flag 130 is rendered tacky by the adhesive coating 140, while a second longitudinal end portion 139 of the second major surface 136 of each tape flag 130 is rendered nontacky by any suitable means such as application of a liner (not shown), application of detackifying particles (not shown), avoiding the initial application of adhesive 140 to the area, etc. This effectively divides the tape flag 130 into a tacky longitudinal end portion 138 and a nontacky longitudinal end portion 139.

TAPE FLAG PAD

The pad 120 of adhesive tape flags 130 defines a longitudinal axis 120*x* and a lateral axis 120*y*, and has a first longitudinal edge 121 and a second longitudinal edge 122. The pad 120 has an uppermost tape flag 130*u* and a lowermost tape flag 130*p*.

The pad 120 is formed from any desired number of individual adhesive tape flags 130, preferably between about 10 and 120 tape flags 130, by adhering the second major surface 136 of each individual tape flag 130 to the first major surface 135 of an immediately underlying tape flag 130. The tacky first longitudinal end portion 68 of the leader strip 60 is adhesively bonded to the first major surface 35 of the uppermost tape strip 30*u* while the nontacky second longitudinal end portion 69 defines a pull tab portion 69 which can be lifted from the pad 20 and pulled to initiate dispensing of the individual adhesive tape flags 130 from the pad 120.

The individual adhesive tape flags 130 are then stacked in a Z pattern with successive flags 130 in the pad 120 positioned with the tacky area 138 of each flag 130 alternating between the first 121 and second 122 longitudinal edges of the pad 120. Such an alternating pattern causes the nontacky area 139 of each flag 130 to be pulled from the surface of the pad 120 when an immediately overlying flag 130 is peeled from the pad 120.

For purposes of facilitating further discussion of the invention, the balance of the discussion will be based upon the adhesive tape strip embodiment only. This is not intended and should not be construed to limit the scope of the invention in any way.

LEADER STRIP

A leader strip 60 having substantially the same width and about one half to three quarters the length of the adhesive tape strip pad 20 is aligned with and superimposed over the first major surface 35 of the uppermost tape strip 30*u* proximate the first longitudinal edge 21 of the pad 20.

The leader strip 60 defines a longitudinal axis 60*x* and a lateral axis 60*y* and has a first longitudinal end 61, a second longitudinal end 62, a first lateral side 63, a second lateral side 64, a first major surface 65, and a second major surface 66. The second major surface 66 of the leader strip 60 is coated with an adhesive 40, such as a repositionable adhesive or permanent pressure sensitive adhesive. A detackifying coating 67 is positioned over the adhesive 40 along a second longitudinal end portion 69 of the leader strip 60 so as to divide the leader strip 60 into a tacky first longitudinal end portion 68 and a nontacky second longitudinal end portion 69. The tacky first longitudinal end portion 68 of the leader strip 60 is adhesively bonded to the first major surface 35 of the uppermost tape strip 30*u* while the nontacky second longitudinal end portion 69 defines a pull tab portion 69 which can be lifted from the pad 20 and pulled to initiate dispensing of the individual adhesive tape strips 30 from the pad 20.

The first longitudinal end 61 of the leader strip 60 is aligned with the first longitudinal edge 21 of the pad 20 so as to position the tacky first longitudinal end portion 68 of the leader strip 60 proximate the second longitudinal edge 22 of the pad 20. The nontacky second longitudinal end portion 69 of the leader strip 60 is positioned intermediate the first 21 and second 22 longitudinal edges of the pad 20 so as to form a nontacky centrally positioned pull tab portion 69.

The pull tab portion 69 is preferably positioned on the pad 20 so that the free longitudinal end 61 of the pull tab portion 69 is longitudinally spaced less than about one fifth of the longitudinal length of the pad 20 away from the lateral axis 20*y* of the pad 20.

More specifically, the pull tab portion 69 is preferably positioned on the pad 20 such that a plane defined by the lateral axis 60*y* of the pull tab portion and the lateral axis 20*y* of the pad 20 extends substantially perpendicular to a plane defined by the uppermost tape strip 30*u*.

Alternatively, the pull tab portion 69 is preferably positioned on the pad 20 such that a plane defined by the free longitudinal end 61 of the pull tab portion 69 and the lateral axis 20*y* of the pad 20 extends substantially perpendicular to a plane defined by the uppermost tape strip 30*u*.

A third alternative method of measuring the desired position of the pull tab portion 69 on the pad 20 longitudinally positions the free longitudinal end 61 of the pull tab portion 69 between a first longitudinal boundary defined by the longitudinal position of the lateral axis 20*y* of the pad 20, and a second longitudinal boundary extending a distance of about one fifth of the longitudinal length of the pad 20 from the lateral axis 20*y* of the pad 20 towards the first longitudinal edge 21 of the pad 20.

A fourth alternative method of measuring the desired position of the pull tab portion 69 on the pad 20 positions the free longitudinal end 61 of the pull tab portion 69 proximate the lateral center of the opening 74 in the dispenser 70.

DISPENSER

The adhesive tape strip pads 20 and adhesive tape flag pads 120 can be conveniently dispensed from any of the commonly used dispensers for such pads. Exemplary dispensers 70 are shown in FIGS. 1 through 6 (first embodiment) and FIG. 10 (second embodiment). The dispensers 70 have a base 71, a front wall 72*f*, a back wall 72*b*, side walls 72, and a top 73 split between a first side 73*f* and a second side 73*b* by a centrally positioned opening 74 which extends substantially the entire width of the retention chamber 76 defined by the dispenser 70. The length of the opening 74 is large enough to permit the passage of a tape strip 30 through the opening 74 yet small enough to prevent the full length of a tape strip 30 from falling back into the retention chamber 76 once a portion of the tape strip 30 has been pulled through the opening 74. As shown best in FIGS. 4 through 6, removal of a tape strip 30 from the dispenser 70 causes an end portion (unnumbered) of the immediately underlying a tape strip 30 to be pulled through the opening 74 and rest upon one of the abutment surfaces 74*r* and 74*s* where it is presented for future removal from the dispenser 70. A cover 80 seals the opening 74 through the top 73 of the dispenser 70.

The center tabbed pads 20 of this invention are particularly useful in connection with open throat dispensers, such as shown in FIGS. 1 through 6 and 10, in which the opening 74 in the top 73 of the dispenser 70 is of sufficient size, generally about one third to three fourths the length of the pad retained within the dispenser 70, to permit a user to reach through the opening 74 and into the retention chamber 76 to access the pull tab portion 69 on the leader strip 60. Alternatively, although less preferred, the pull tab portion 69 on the leader strip 60 may be attached to the cover 80 so that the leader strip 60 is pulled from the dispenser 70, along with a portion of the uppermost adhesive tape strip 30*u*, when the cover 80 is removed from the dispenser 70. Use of such an alternative embodiment is necessary when the opening 74 in the top 73 of the dispenser 70 is less than about 2 cm since a user cannot reach into the retention chamber 76 to access the pull tab portion 69. Due to the necessity of a larger opening 74 in nonshuttling dispensers 70, the pad 20 should be adhered to the base 71 of the dispenser 70 in order to prevent the pad 20 from being pulled through the opening 74 when individual strips 30 are pulled from the pad 20.

The dispenser 70 may be constructed as a single use dispenser to be discarded when the pad 20 of tape strips 30 or pad 120 of tape flags 130 within the retention chamber 76 are exhausted, or a refillable dispenser, such as shown in phantom on FIG. 16, equipped with a mechanism operable for allowing accesses to the retention chamber 76 for purposes of inserting a new pad 20, 120 into the chamber 76. The center tabbed leader strip 60 provides the advantage of allowing the pad 20 to be partially inserted into the dispenser 70 with the pull tab portion 69 resting against the first abutment surface 75*f* while the operator presses down on the other end of the pad 20 and closes the chamber door (unnumbered).

The dispenser 70 may be constructed as a shuttling dispenser or a nonshuttling dispenser. As shown in FIG. 16, a shuttling dispenser 70 has a retention chamber 76 with a length which permits the pad 20 within the chamber 76 to shuttle back and forth within the chamber 76 as individual tape strips 30 are pulled from the pad 20. Alternatively, as shown in FIGS. 1 through 6 and 10, a nonshuttling dispenser 70 has a retention chamber 76 which is sized to accommodate a pad 20 with substantially no space for back and forth shuttling of the pad 20 within the chamber 76 as individual tape strips 30 are pulled from the pad 20.

METHOD OF MAKING

The center tabbed adhesive tape strip pads 20 of this invention, as well as center tabbed adhesive tape flag pads 120, may be quickly, easily and reliably manufactured from large master pads 200 of the type commonly utilized to produce standard adhesive tape strip pads.

The center tabbed aspect of the invention may be conveniently added to a master pad 200 using lengths of tabbing material 210 which are configured with (i) first 213 and second 214 sides; (ii) a first major surface (not shown) having nontacky first and second side margins 218 and an adhesively coated tacky central area 219 between the side margins, and (iii) a nontacky second major surface (not shown).

The procedure for applying the lengths of tabbing material 210 to a master pad 200 and cutting the resultant tabbed master pad 200 to produce the desired adhesive tape strip pads 20 includes the steps of (1) conveying a master pad 200 of superimposed adhesively coated sheets in a machine direction 200*m*; (2) simultaneously conveying continuous lengths of tabbing material 210 in the machine direction 200*m*, (3) laminating the first major surface (not shown) of each length of tabbing material 210 to the exposed second major surface (unnumbered) of the uppermost sheet (unnumbered) on the master pad 200, with the lengths of tabbing material 210 laterally positioned on the master pad 200 so as to create side margins 205 and intermediate gaps 206 between neighboring lengths of tabbing material 210 which are not covered with tabbing material 210; (4) cutting the tabbed master pad 200 in the machine direction 200*m* along the central longitudinal axis 219*m* of the tacky portion 219 of the tabbing material 210 and along a line which is centrally positioned within the intermediate gaps 206 between lengths of tabbing material 210 so as to produce continuous machine direction lengths of tape; and (5) cutting the tabbed master pad in the transverse direction 200*t* so as to produce tape strip pads 20 of the desired width.

The lateral length of the side margins 205 on the master pad 200 which are not covered with tabbing material 210 are preferably about one third to one half the lateral length of the tacky central area 219 on the tabbing material 210 in order to result in proper positioning of the nontacky side margins 218 on the resultant adhesive tape strip pads 20 which include such side margins 205. For the same reason, the intermediate gaps 206 between neighboring lengths of tabbing material 210 on the master pad 200 which are not covered with tabbing material 210 are preferably about the same lateral length as the tacky central area 219 on the tabbing material 210.

METHOD OF USING

Figure 3:
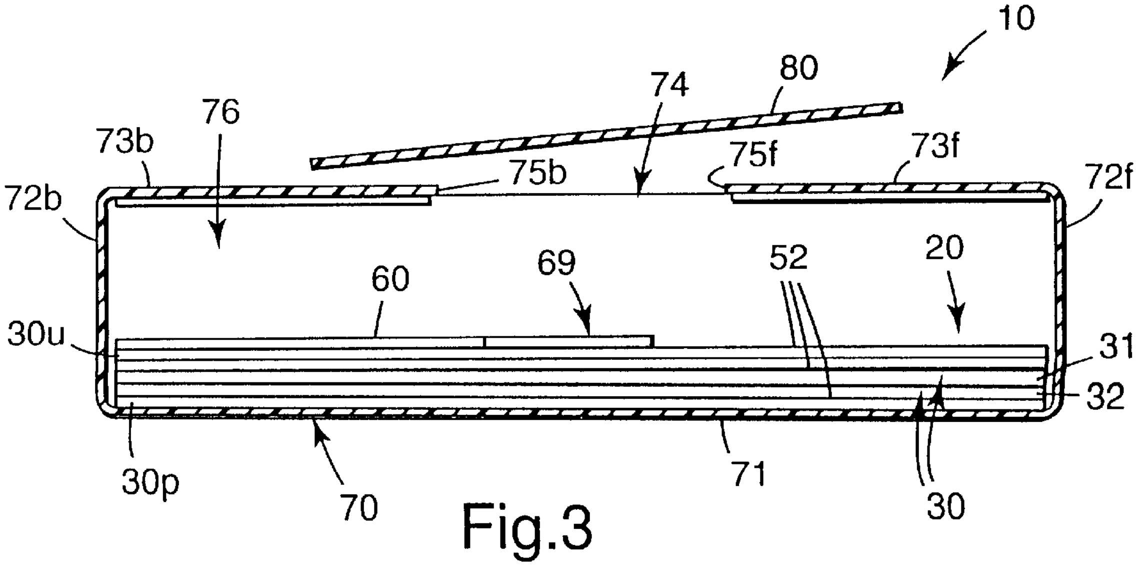
Figure 4:
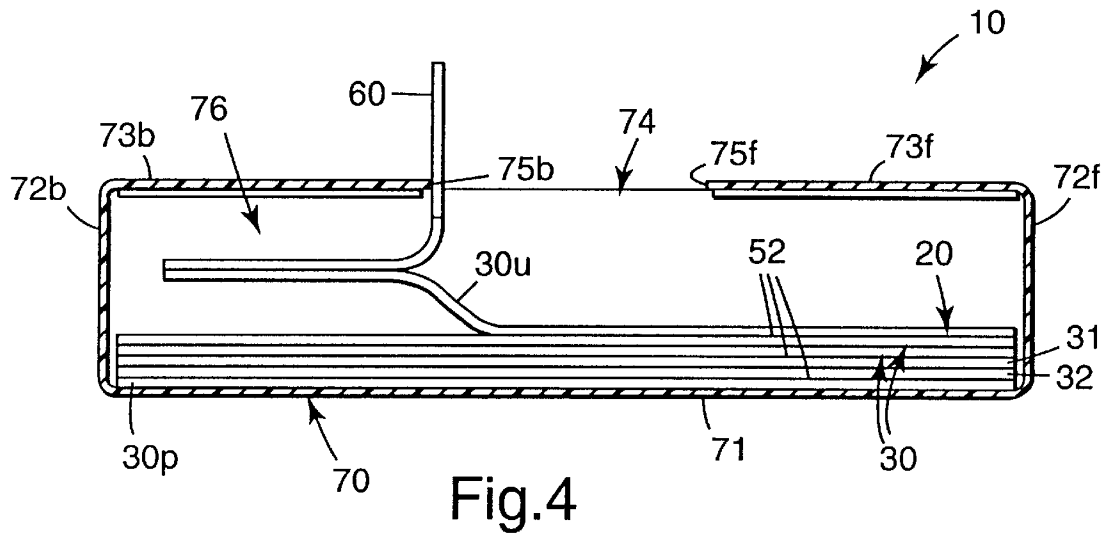
Figure 5:
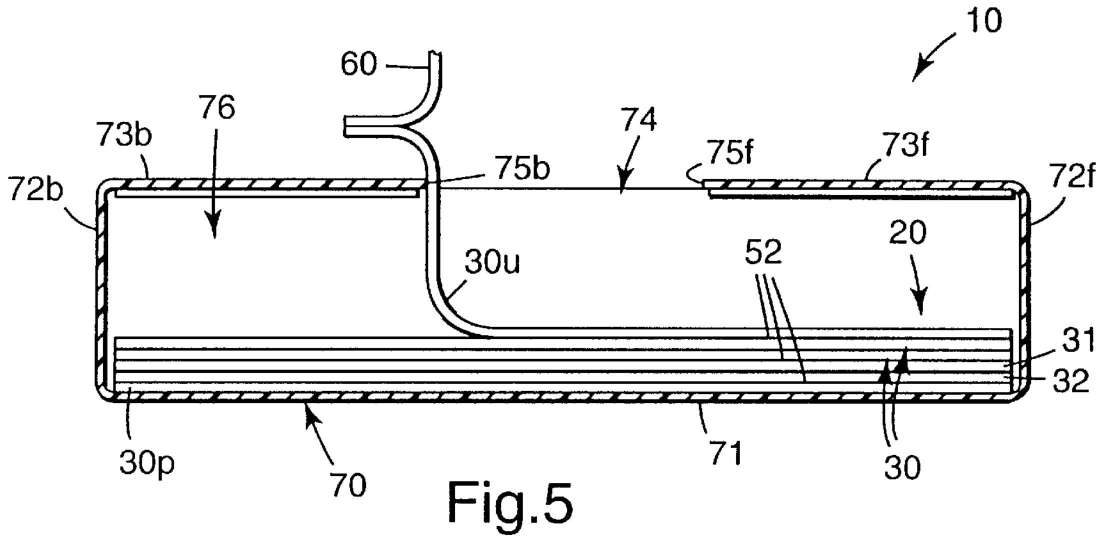
Figure 6:
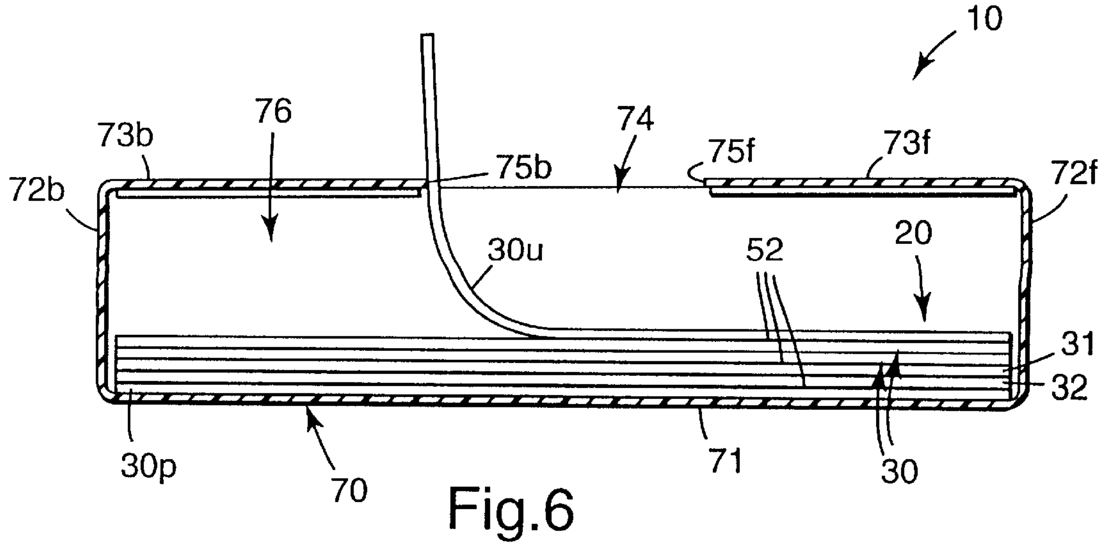
Figure 10:
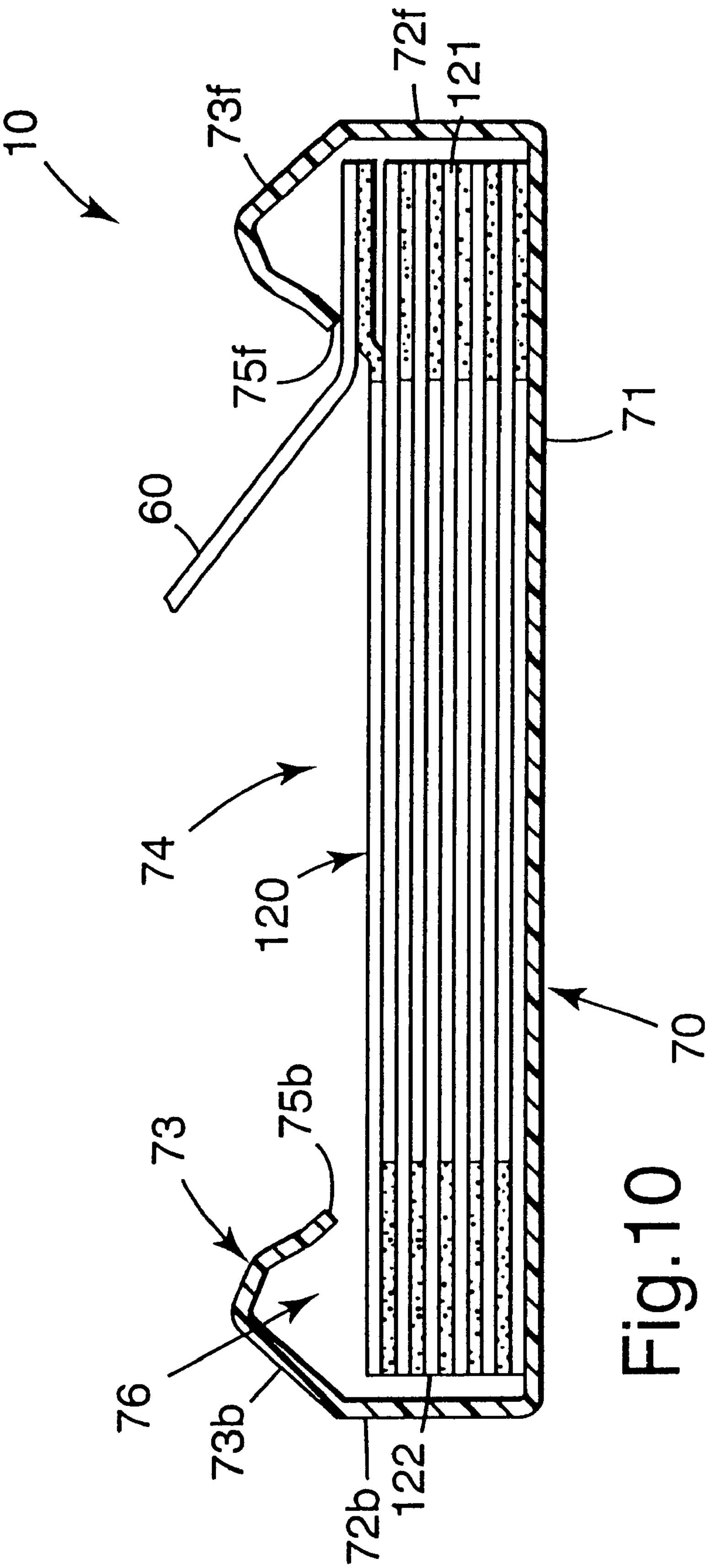
FIG. 10 is a side view of a second embodiment of the invention depicting adhesive tape flags within an open dispenser prior to pulling of the leader strip from the pad of adhesive tape flags.
Figure 11:
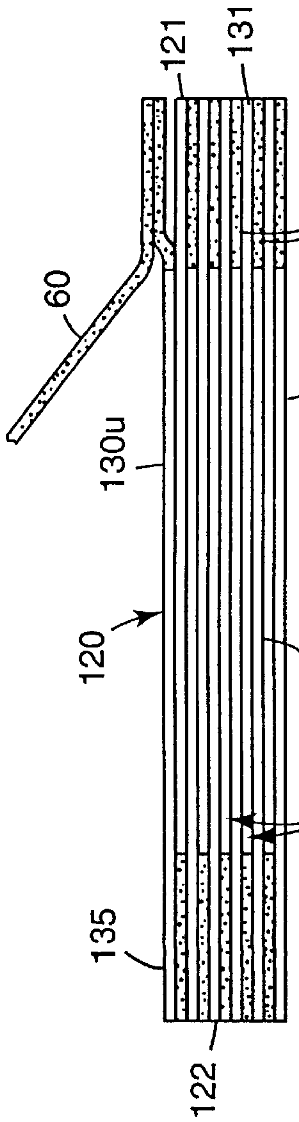
FIG. 11 is a side view of the adhesive tape flag pad shown in FIG. 10.
Figure 12:
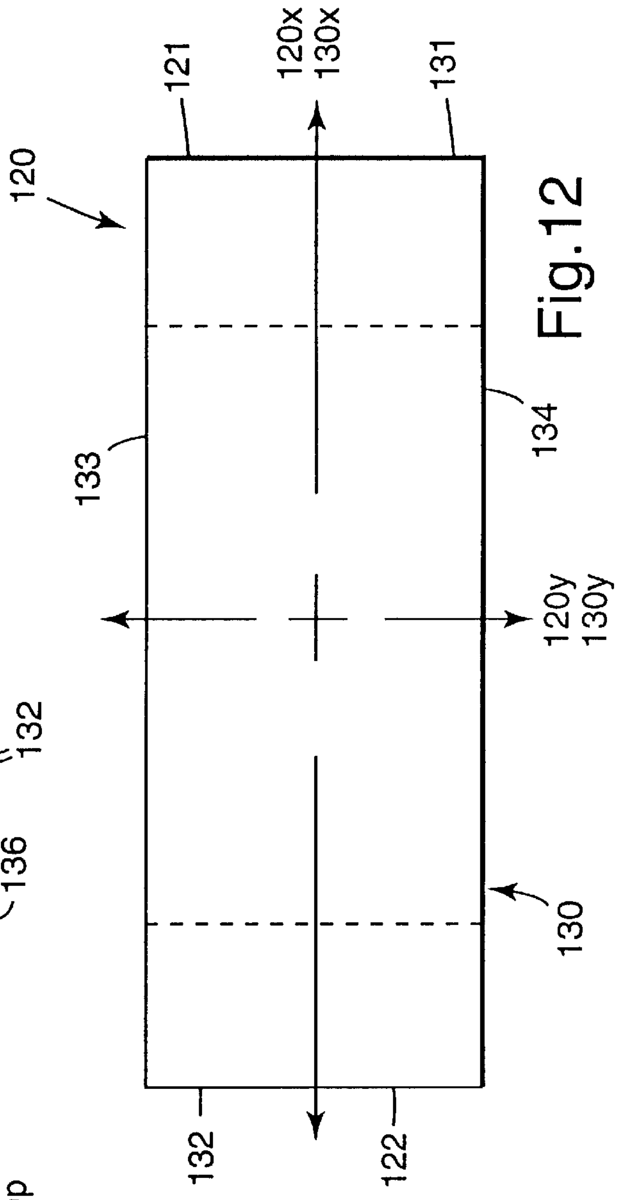
FIG. 12 is a top view of the adhesive tape flag pad shown in FIG. 11.
Figure 13:
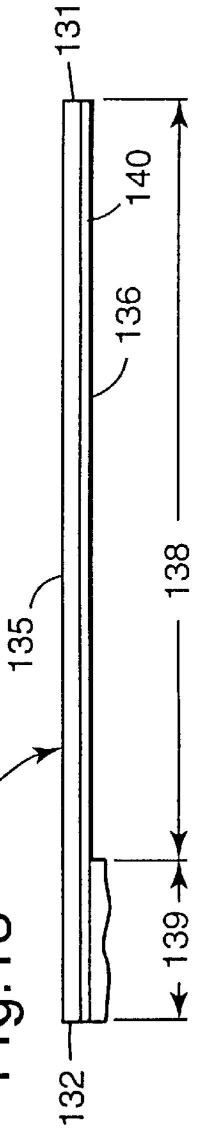
FIG. 13 is an enlarged and exploded side view of one of the adhesive tape flags shown in FIG. 11.

Use of a dispenser package 10 containing the center tabbed adhesive tape strip pad 20 of the invention is illustrated in FIGS. 2 through 6. First, the cover 80 is removed from the dispenser 70 (FIG. 3). The exposed pull tab portion 69 is then gripped with the thumb and pointer finger and pulled through the opening 74 in the top 73 of the dispenser 70 (FIG. 4) until the leader strip 60 is pulled completely out of the retention chamber 76 (FIG. 5). This causes a first longitudinal end 31 of the uppermost adhesive tape strip 30*u* to be pulled through the opening 74 in the top 73 of the dispenser 70 (FIG. 5) and rest against the second abutment surface 75*b* on the dispenser 70 once the leader strip 60 is fully detached (FIG. 6).

We claim:

1. An adhesive tape strip pad comprising:

(a) a plurality of superimposed tape strips having generally equal predetermined lengths, wherein the tape strips include:

(1) a flexible substrate having first and second major surfaces;

(2) a low adhesion backsize coated onto the first major surface of the substrate; and (3) an adhesive coated onto the second major surface of the substrate;

(4) with the plurality of superimposed tape strips forming a unitary pad having (i) a first longitudinal edge, (ii) a second longitudinal edge, (iii) an uppermost tape strip having an exposed first major surface, and (iv) a lowermost tape strip having an exposed second major surface; and (b) a leader strip having a length less than the predetermined length of the tape strips aligned with and superimposed over a longitudinal portion of the exposed first major surface of the uppermost tape strip, said leader strip having first and second major surfaces and including:

(1) adhesive coated onto the leader strip second major surface; and (2) a detackifing coating applied onto a portion of the adhesive, thereby defining tacky and nontacky longitudinal end portions on said leader strip second major surface, wherein:

(3) the tacky longitudinal end portion of the leader strip is positioned over and adhesively bonded to the longitudinal end of the exposed first major surface of the uppermost tape strip, and (4) the nontacky longitudinal end portion of the leader strip is positioned intermediate the first and second longitudinal edges of the pad so as to form a nontacky centrally positioned pull tab portion.

2. An adhesive flag pad comprising:

(a) a plurality of superimposed tape flags having generally equal predetermined lengths wherein:

(1) each flag is comprised of a flexible substrate having first and second major surfaces, with the first major surface having (i) a tacky area proximate a first longitudinal end of the flag which is coated with an adhesive, and (ii) a nontacky area proximate a second longitudinal end of the flag; and (2) the plurality of superimposed flags form a unitary pad having (i) a first longitudinal edge, (ii) a second longitudinal edge, (iii) an uppermost tape flag with an exposed first major surface, and (iv) a lowermost tape flag with an exposed second major surface; and (b) a leader strip having a length less than the predetermined length of the tape flags aligned with and superimposed over a longitudinal end portion of the exposed first major surface of the uppermost tape flag, said leader strip having first and second major surfaces and including:

(1) adhesive coated onto the leader strip second major surface; and (2) a detackifying coating applied onto a portion of the adhesive, thereby defining tacky and nontacky longitudinal end portions on said leader strip second major surface, wherein:

(3) the tacky longitudinal end portion of the leader strip is positioned over and adhesively bonded to the longitudinal end of the exposed first major surface of the uppermost tape flag; and (4) the nontacky longitudinal end portion of the leader strip is positioned intermediate the first and second longitudinal edges of the pad so as to form a nontacky centrally positioned pull tab portion.

3. The pad of claim I wherein:

(a) each tape strip adheres to the first major surface of an immediately underlying strip with a first adhesive strength, except for a selected area proximate one of the longitudinal edges of the strip which adheres to the first major surface of the immediately underlying strip with a second adhesive strength;

(b) each successive strip in the pad is positioned so that the selected area of each strip alternates between the first and second longitudinal edges of the pad; and (c) the second adhesive strength is sufficiently less than the first adhesive strength that the selected portion of each strip delaminates from the immediately underlying strip when an immediately overlying strip is peeled from the pad.

4. The pad of claim 3 wherein (a) the adhesive is pattern coated onto the second major surface of each tape strip so as to define;

(1) a primary area of the strip proximate one of the longitudinal ends of the strip having a primary adhesive coating pattern, and (2) a secondary area of the strip proximate the other longitudinal end of the strip having a secondary adhesive coating pattern, (3) whereby the primary area of each tape strip adheres to an immediately underlying strip at the first adhesive strength, and the secondary area of each tape strip adheres to an immediately underlying sheet at the secondary adhesive strength;

(b) the strips are positioned within the pad so that the secondary area of each successive strip alternates between the first and second longitudinal edges of the pad; and (c) the second adhesive strength is sufficiently less than the first adhesive strength that the secondary area of each strip delaminates from the immediately underlying strip when an immediately overlying strip is peeled from the pad.

5. The pad of claim 3 wherein:

(a) the low adhesion backsize is pattern coated onto the first major surface of each tape strip so as to define;

(1) a primary area on the first major surface of each strip proximate one of the longitudinal edges of the strip having a primary coating pattern, and (2) a secondary area on the first major surface of each strip proximate the other longitudinal edge of the strip having a secondary coating pattern, (3) whereby each tape strip adheres to the primary area of the immediately underlying strip at the first adhesive strength, and adheres to the secondary area of the immediately underlying strip at the secondary adhesive strength;

(b) the strips are positioned within the pad so that the secondary area of each successive strip alternates between the first and second longitudinal edges of the pad; and (c) the second adhesive strength is sufficiently less than the first adhesive strength that the secondary area of each strip delaminates from the immediately underlying strip when an immediately overlying strip is peeled from the pad.

6. The pad of claim 1 wherein (i) the pad has a longitudinal length and a lateral axis, and (ii) the first longitudinal end of the pull tab portion is longitudinally positioned a distance of less than about one fifth the longitudinal length of the pad away from the lateral axis of the pad.

7. The pad of claim 2 wherein (i) the pad has a longitudinal length and a lateral axis, and (ii) the first longitudinal end of the pull tab portion is longitudinally positioned a distance of less than about one fifth the longitudinal length of the pad away from the lateral axis of the pad.

8. The pad of claim 6 wherein (i) the pull tab portion has a lateral axis, and (ii) the pull tab portion is positioned relative to the pad such that a plane defined by the lateral axis of the pull tab portion and the lateral axis of the pad extends substantially perpendicular to a plane defined by the uppermost tape strip.

9. The pad of claim 7 wherein (i) the pull tab portion has a lateral axis, and (ii) the pull tab portion is positioned relative to the pad such that a plane defined by the lateral axis of the pull tab portion and the lateral axis of the pad extends substantially perpendicular to a plane defined by the uppermost flag.

10. The pad of claim 6 wherein the pull tab portion is positioned relative to the pad such that a plane defined by the first longitudinal end of the pull tab portion and the lateral axis of the pad extends substantially perpendicular to a plane defined by the uppermost tape strip.

11. The pad of claim 7 wherein the pull tab portion is positioned relative to the pad such that a plane defined by the first longitudinal end of the pull tab portion and the lateral axis of the pad extends substantially perpendicular to a plane defined by the uppermost flag.

12. The pad of claim 1 wherein (i) the pad has a lateral axis, and (ii) the first longitudinal end of the pull tab portion is longitudinally positioned between a first longitudinal boundary defined by the longitudinal position of the lateral axis of the pad, and a second longitudinal boundary extending a distance of about one fifth of the longitudinal length of the pad from the lateral axis of the pad towards the first longitudinal edge of the pad.

13. The pad of claim 2 wherein (i) the pad has a lateral axis, and (ii) the first longitudinal end of the pull tab portion is longitudinally positioned between a first longitudinal boundary defined by the longitudinal position of the lateral axis of the pad, and a second longitudinal boundary extending a distance of about one fifth of the longitudinal length of the pad away from the lateral axis of the pad towards the first longitudinal edge of the pad.

14. A product comprising:

(a) an enclosure which (i) defines a retention chamber of defined length, width and depth, and (ii) has (A) a base, (B) side walls, (C) a top, and (D) a centrally positioned opening through the top having a width which extends substantially the entire width of the retention chamber;

(b) the tape strip pad of claim 1 retained within the retention chamber; and (c) a cover effective for (i) removably sealing the opening through the top of the enclosure, and (ii) being removed from the enclosure without automatically pulling the leader strip;

(d) wherein the length of the opening through the top of the enclosure is large enough to permit the passage of a tape strip through the opening and small enough to prevent the full length of a tape strip from falling back into the retention chamber once a portion of the tape strip has been pulled through the opening.

15. The product of claim 14 wherein (i) the tape strip has a defined length, width and depth, and (ii) the length of the retention chamber is between about 1½ to 2 times greater than the length of the tape strip pad so as to permit the tape strip pad to shuttle within the retention chamber as individual tape strips are pulled from the pad through the opening in the top of the enclosure.

16. The product of claim 14 wherein the length of the centrally positioned opening through the top is between about one third to about three fourths the length of the tape pad.

17. The product of claim 14 wherein the tape strip pad is adhered to the base of the enclosure.

18. A product comprising:

(a) an enclosure which (i) defines a retention chamber of defined length, width and depth, and (ii) has (A) a base, (B) side walls, (C) a top, and (D) a centrally positioned opening through the top having a width which extends substantially the entire width of the retention chamber;

(b) the tape flag pad of claim 2 retained within the retention chamber; and (c) a cover effective for (i) removably sealing the opening through the top of the enclosure, and (ii) being removed from the enclosure without automatically pulling the leader strip;

(d) wherein the length of the opening through the top of the enclosure is large enough to permit the passage of a tape flag through the opening and small enough to prevent the full length of a tape flag from falling back into the retention chamber once a portion of the tape flag has been pulled through the opening.

19. The product of claim 18 wherein (i) the tape flag pad has a defined length, width and depth, and (ii) the length of the retention chamber is between about 1½ to 2 times greater than the length of the tape flag pad so as to permit the tape flag pad to shuttle within the retention chamber as individual tape flags are pulled from the pad through the opening in the top of the enclosure.

20. The product of claim 18 wherein the length of the centrally positioned opening through the top is between about 1 to 5 mm.

21. The product of claim 18 wherein the tape flag pad is adhered to the base of the enclosure.

22. A product comprising:

(a) an enclosure which (i) defines a retention chamber of defined length, width and depth, and (ii) has (A) a base, (B) side walls, (C) a top, and (D) a centrally positioned opening through the top having a width which extends substantially the entire width of the retention chamber;

(b) the tape strip pad of claim 3 retained within the retention chamber; and (c) a cover effective for (i) removably sealing the opening through the top of the enclosure, and (ii) being removed from the enclosure without automatically pulling the leader strip;

(d) wherein the length of the opening through the top of the enclosure is large enough to permit the passage of a tape strip through the opening and small enough to prevent the full length of a tape strip from falling back into the retention chamber once a portion of the tape strip has been pulled through the opening.

23. A pad of sheets having first and second longitudinal edges, comprising:

(a) a plurality of superimposed adhesively bonded sheets including an uppermost sheet, each said sheet having a generally equal predetermined length; and (b) a leader strip having first and second major surfaces and a length less than the predetermined length of said sheets, said leader strip including:

(1) an adhesive coating applied to said second major surface; and (2) a detackifying coating applied over a portion of said adhesive coating adjacent a free first end of said leader strip;

wherein said adhesive coating and said detackifying coating combine to define a tacky first end portion of said leader strip adhesively bonded to said uppermost sheet adjacent one of the pad first and second longitudinal edges, and a centrally positioned nontacky pull tab portion arranged intermediate the pad first and second longitudinal edges.

* * * * *